Sept. 3, 1940.   H. HERRMANN   2,213,279
METHOD OF PRODUCING SELENIUM DISKS FOR RECTIFIERS AND PHOTOELECTRIC CELLS
Filed April 29, 1939
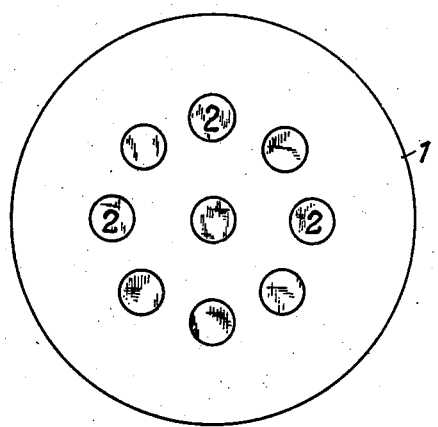
Inventor:
Heinrich Herrmann
by ........ Att'y Patented Sept. 3, 1940

2,213,279

UNITED STATES PATENT OFFICE 2,213,279

METHOD OF PRODUCING SELENIUM DISKS FOR RECTIFIERS AND PHOTOELECTRIC CELLS

Heinrich Herrmann, Nuremberg, Germany, assignor to Süddeutsche Apparate-Fabrik G. m. b. H., Nuremberg, Germany, a company Application April 29, 1939, Serial No. 270,774
In Germany May 4, 1938

1 Claim. (Cl. 175—366)

The invention relates to dry rectifiers and photoelectric cells of the kind having a base plate coated with a selenium layer on which a disk-shaped electrode is arranged. This electrode is made to be impervious to light if the selenium layer is to act as a rectifying means, but is light-permeable if the selenium layer is to be used for photoelectric purposes. When manufacturing such selenium disks, in order always to produce a predetermined thickness thereof, namely, the thickness best adapted for the purpose, the practice has been to use a measuring spoon with the aid of which the selenium powder is applied to the base plate to form heaps thereon after this plate has been heated to some 300 degrees centigrade. Such heaps are then spread out on the base plate by means of a glass rod so as to form a coating on it. According to the area of the plate so coated with the selenium layer a greater or smaller number of selenium heaps have been applied in this way to the base plate, the contents of such measuring spoon being used up each time for forming a heap.

As the selenium if employed in larger quantity is easier to spread out on the base plate than with smaller quantities thereof the danger exists that more of the selenium is applied to the plate than is necessary for the desired thickness of the selenium layer. If, however, the selenium layer is too thick the losses in the rectifier or photoelectric cell are increased.

The difficulty which thus arises in the manufacture of the selenium disks is avoided by the invention. In accordance with the invention the selenium is not employed in its powdery condition but is used in the form of tablets. The known tabletting machines enable the manufacture of selenium tablets which contain a precisely predetermined quantity of selenium. By tabletting the quantity of selenium to be applied this can be properly dosed, the application of the proper quantity thereof thus being easy to supervise in the course of manufacture. For instance, the addition of one tablet beyond the prescribed number will be easy to perceive. Also, the base plates and selenium tablets may be well counted out to the worker. Furthermore, the novel method involves a considerable saving of time since the selenium tablets are more ready to handle than is the selenium powder.

The novel method is illustrated by way of example in the accompanying drawing, in which Fig. 1 shows one step thereof; Fig. 2 is a plan of the arrangement represented in Fig. 1; Fig. 3 is a side view of the finished selenium disk.

I denotes the base plate which in well known manner serves as one electrode. On this plate selenium tablets 2 are placed in the course of manufacture. These are then spread out by means of a suitable tool in a manner to produce a selenium coating 2' on the plate I, as will be obvious from Fig. 3. Fitted to the coating 2' is the second electrode 3.

What is claimed is:

A method of producing selenium disks for rectifiers and photoelectric cells which comprises arranging selenium tablets on a base plate and spreading out these tablets to form a coating thereon.

HEINRICH HERRMANN.